United States Patent
Li et al.

(10) Patent No.: US 11,804,194 B2
(45) Date of Patent: Oct. 31, 2023

(54) VIRTUAL REALITY DISPLAY DEVICE AND DISPLAY METHOD

(71) Applicants: Beijing BOE Optoelectronics Technology Co., Ltd., Beijing (CN); BOE Technology Group Co., Ltd., Beijing (CN)

(72) Inventors: Wenyu Li, Beijing (CN); Jinghua Miao, Beijing (CN); Lili Chen, Beijing (CN); Hao Zhang, Beijing (CN)

(73) Assignees: Beijing BOE Optoelectronics Technology Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 223 days.

(21) Appl. No.: 17/416,477

(22) PCT Filed: Dec. 29, 2020

(86) PCT No.: PCT/CN2020/140974
§ 371 (c)(1),
(2) Date: Jun. 19, 2021

(87) PCT Pub. No.: WO2021/169578
PCT Pub. Date: Sep. 2, 2021

(65) Prior Publication Data
US 2023/0178044 A1 Jun. 8, 2023

(30) Foreign Application Priority Data
Feb. 25, 2020 (CN) .......................... 202010115007.3

(51) Int. Cl.
*G09G 3/36* (2006.01)
*G06F 3/01* (2006.01)
(Continued)

(52) U.S. Cl.
CPC .......... *G09G 3/3607* (2013.01); *G06F 3/011* (2013.01); *G09G 5/391* (2013.01); *G06F 2111/18* (2020.01)

(58) Field of Classification Search
CPC ...... G09G 3/3607; G09G 5/391; G06F 3/011; G06F 2111/18; G05B 2219/40131
See application file for complete search history.

(56) References Cited

U.S. PATENT DOCUMENTS

2015/0179147 A1* 6/2015 Rezaiifar ................ G06F 3/011
345/625
2015/0248210 A1 9/2015 Lee et al.
(Continued)

FOREIGN PATENT DOCUMENTS

CN 107526428 A 12/2017
CN 107742512 A 2/2018
(Continued)

OTHER PUBLICATIONS

CN202010115007.3 First Office Action.
CN202010115007.3 Second Office Action.

*Primary Examiner* — Roy P Rabindranath
(74) *Attorney, Agent, or Firm* — IPRO, PLLC (57) ABSTRACT

A virtual reality (VR) display device and a display method are provided, so as to improve the problems that an existing VR display device has higher power consumption and waste of resources. The display method for the VR display device includes: in response to a first operation of a user, initiating a smartview mode (S101); controlling display in a first display region of a screen of the VR display device to be at first definition; controlling display in a second display region, other than the first display region, of the screen of the VR display device to be at second definition (S102); and supplementing and displaying black for part of pixels in the second display region (S103); the first display region is a
(Continued)

region watched by human eyes; and the first definition is greater than the second definition.

18 Claims, 4 Drawing Sheets

(51) Int. Cl.
    *G09G 5/391* (2006.01)
    *G06F 111/18* (2020.01)

(56) References Cited

U.S. PATENT DOCUMENTS

| | | | |
|---|---|---|---|
| 2017/0316607 A1* | 11/2017 | Khalid | ............... G02B 27/017 |
| 2018/0275410 A1 | 9/2018 | Yeoh et al. | |
| 2019/0138089 A1 | 5/2019 | Li et al. | |
| 2021/0058612 A1 | 2/2021 | Sun et al. | |
| 2021/0183115 A1* | 6/2021 | Doidge | ............... G06F 3/011 |
| 2021/0225329 A1 | 7/2021 | Shi et al. | |

FOREIGN PATENT DOCUMENTS

| | | |
|---|---|---|
| CN | 109388448 A | 2/2019 |
| CN | 109741289 A | 5/2019 |
| CN | 110378914 A | 10/2019 |
| CN | 110488977 A | 11/2019 |
| CN | 110679147 A | 1/2020 |
| CN | 111338591 A | 6/2020 |

\* cited by examiner

VIRTUAL REALITY DISPLAY DEVICE AND DISPLAY METHOD

CROSS REFERENCE TO RELATED APPLICATIONS

This application is a national phase entry under 35 U.S.C. § 371 of International Application No. PCT/CN2020/140974, filed on Dec. 29, 2020, which claims the priority from Chinese Patent Application No. 202010115007.3, filed with the China National Intellectual Property Administration on Feb. 25, 2020, the entire content of which is incorporated herein by reference.

FIELD

The present disclosure relates to the technical field of displaying, and more particularly relates to a virtual reality display device and a display method.

BACKGROUND

A virtual reality (VR) technology is an advanced technology that has emerged in recent years. It uses computer hardware, software, and sensors to establish a VR environment so that users can experience and interact with a virtual world through a VR device.

The monocular resolution of a mainstream VR device is 1080*1200. A VR device with monocular 4320*4320 or higher resolution is a parameter that does not yet appear on the market. The introduction of a smartview technology has solved the bottleneck in hardware transmission and software rendering of monocular high-resolution images to a certain extent. In conjunction with an eyetracking algorithm, the resolution requirement of a watching region is guaranteed, and the rendering pressure and transmission bandwidth are also reduced.

However, the VR display device in the existing technology has problems of higher power consumption and waste of resources when performing smartview.

SUMMARY

The present disclosure provides a virtual reality (VR) display device and a display method, so as to improve the problems that the VR display device in the existing technology has higher power consumption and waste of resources when performing smartview.

Embodiments of the present disclosure provide a display method of a VR display device, including:
  in response to a first operation of a user, initiating a smartview mode;
  controlling a display in a first display region of a screen of the VR display device to be at a first definition;
  controlling the display in a second display region, other than the first display region, of the screen of the VR display device to be at a second definition; and
  supplementing and displaying black for part of pixels in the second display region;
  the first display region is a region watched by human eyes; and the first definition is greater than the second definition.

In a possible implementation mode, said supplementing and displaying black for part of pixels in the second display region includes:
  a plurality of first closed patterns nested in sequence are formed by controlling pixels with black supplemented of the second display region; and
  a plurality of second closed patterns nested in sequence are formed by controlling pixels without black supplemented of the second display region;
  the first closed patterns and the second closed patterns are alternately arranged.

In a possible implementation mode, shapes of the first closed patterns and the second closed patterns are similar to a shape of the first display region.

In a possible implementation mode, said supplementing and displaying black for part of pixels in the second display region includes:
  a plurality of first pixel groups, extending in a first direction, are formed by controlling pixels with black supplemented of the second display region; and
  a plurality of second pixel groups, extending in the first direction, are formed by controlling pixels without black supplemented of the second display region;
  the first pixel groups and the second pixel groups are alternately arranged.

In a possible implementation mode, the first direction is a pixel row direction or a pixel column direction.

In a possible implementation mode, said controlling the display in the first display region of the screen of the VR display device to be at the first definition; and said controlling the display in the second display region, other than the first display region, of the screen of the VR display device to be at the second definition includes:
  stretching a second image, received for displaying in the second display region, into a stretched second image with a same resolution as a resolution of the screen of the VR display device;
  full-screen displaying the stretched second image in the second display region; and
  covering the first display region by a first image with an original resolution, received for displaying in the first display region; and
  displaying the first image with the original resolution in the first display region.

In a possible implementation mode, the display method further includes:
  in response to a second operation of the user, initiating a real display mode; and
  full-screen displaying a third image with an original resolution in the screen of the VR display device, after the third image with the original resolution is received;
  the original resolution of the third image is same as the resolution of the screen.

In a possible implementation mode, before the in response to the first operation of the user, initiating the smartview mode, the display method further includes: monitoring a user operation in real time.

In a possible implementation mode, after the in response to the first operation of the user, initiating the smartview mode, and before said controlling the display in the first display region of the screen of the VR display device to be at the first definition, and controlling the display in the second display region, other than the first display region, of the screen of the VR display device to be at the second definition, the display method further includes:
  acquiring the region watched by the human eyes;
  rendering an original first image corresponding to the region watched by the human eyes, and rendering an original second image corresponding to other regions other than the region watched by the human eyes; and generating the first image by performing image algorithm processing on the original first image, and generating the second image by performing image algorithm processing on the original second image.

Embodiments of the present disclosure further provide a VR display device, including a processing component. The processing component is used for executing the display method provided by the embodiment of the present disclosure.

DETAILED DESCRIPTION OF THE EMBODIMENTS

In order to make the objectives, technical solutions and advantages of the embodiments of the present disclosure clearer, the technical solutions in the embodiments of the present disclosure are described clearly and completely below in conjunction with the accompanying drawings in the embodiments of the present disclosure. Obviously, the described embodiments are a part of the embodiments of the present disclosure, not all the embodiments. Based on the described embodiments of the present disclosure, all other embodiments obtained by those of ordinary skill in the art without creative work shall fall within the protection scope of the present disclosure.

Unless otherwise defined, technical terms or scientific terms used in the present disclosure shall be ordinary meanings as understood by those of ordinary skill in the art of the present disclosure. The words "first", "second" and similar terms used in the present disclosure do not denote any order, quantity or importance, but are merely used to distinguish different components. The word "comprise" or "include" or the like means that the element or item preceding the word covers the element or object listed after the word and its equivalent, without excluding other elements or objects. The words "connection" or "link" and the like are not limited to physical or mechanical connections, but may include electrical connections, whether direct or indirect. "Upper", "lower", "left", "right", etc., are only used to denote relative position relations. After an absolute position of a described object changes, the relative position relation may also change correspondingly.

In order to keep the following descriptions of the embodiments of the present disclosure clear and concise, detailed descriptions of known functions and known parts are omitted in the present disclosure.

Figure 1:
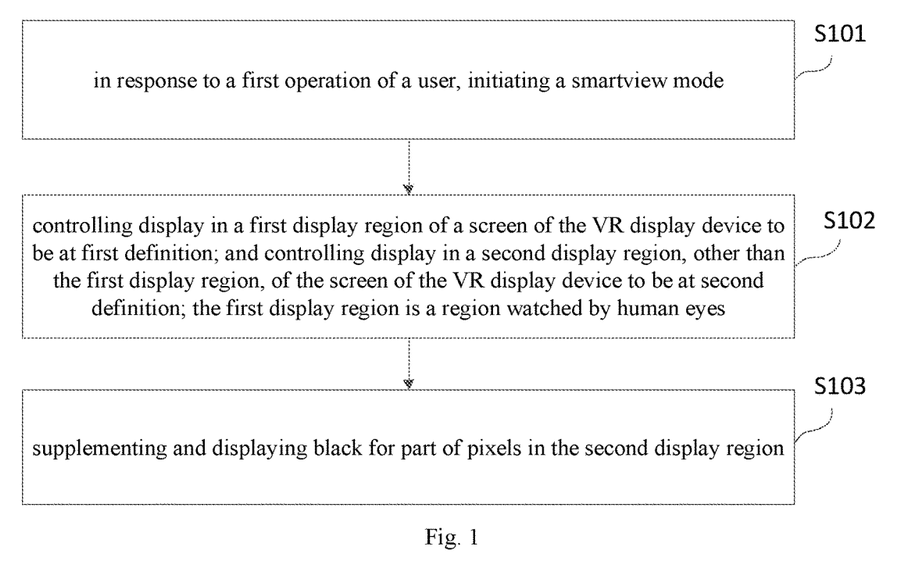
FIG. 1 is a flowchart of a display method for a VR display device provided by an embodiment of the present disclosure.

Referring to FIG. 1, Embodiments of the present disclosure provide a display method of a VR display device, including the following steps.

Step S101, in response to a first operation of a user, a smartview mode is initiated.

The smartview mode corresponds to a mode in which the screen resolution of display device can be adjusted intelligently.

Step S102, controlling the display in a first display region of a screen of the VR display device to be at a first definition; and controlling the display in a second display region, other than the first display region, of the screen of the VR display device to be at a second definition; wherein the first display region is a region watched by human eyes; the first definition is greater than the second definition.

For example, the first display region performs displaying at high definition, and the second display region performs displaying at non high definition.

Step S103, supplementing black for a part of pixels in the second display region and displaying the part of pixels.

For example, pixels are supplemented with black for displaying by controlling gray scaled of the pixels to be 0.

The VR display method provided by the embodiments of the present disclosure includes: in response to the first operation of the user, the smartview mode is initiated; controlling the display in the first display region of the screen of the VR display device to be at the first definition; controlling the display in the second display region, other than the first display region, of the screen of the VR display device to be at the second definition; and supplementing and displaying black for the part of pixels in the second display region, that is, since the second display region is a non-human eyes watching region, it is not mainly used for viewing and displaying; by means of supplementing black for part of pixels of the second display region for displaying, the feature of low resolution of the non-human eyes watching region is better satisfied while watching on the first display region by the human eyes is not affected; moreover, the power consumption of a non-high-resolution display region is greatly reduced; and therefore, the problems of higher power consumption and waste of resources of the VR display device caused by the fact that all pixels of the second display region of the non-human eyes watching region are to be turned on are avoided. Moreover, if the screen for VR displaying is a liquid crystal screen, in the embodiments of the present disclosure, since the pixels of the second display region would be subjected to black supplementation sometimes, liquid crystals do not need to flip all the time; and therefore, the display life of the liquid crystals can be prolonged, and the usage rate of the liquid crystals is increased.

Accordingly, patterns composed of black-supplemented pixels and non-black-supplemented pixels of the second display region are illustrated below.

Figure 2:
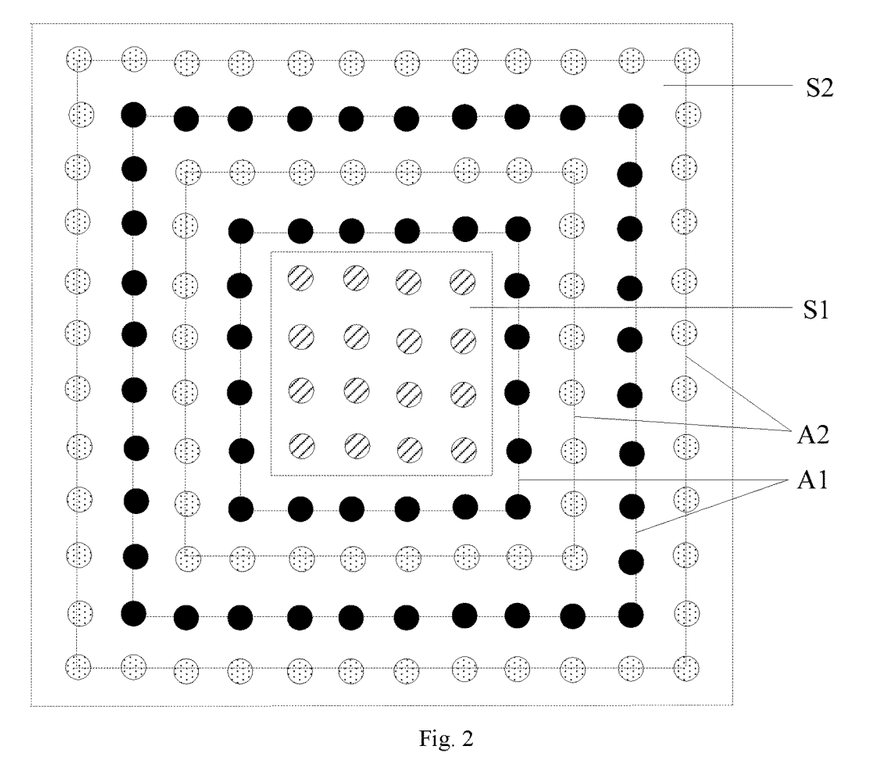
FIG. 2 is a schematic diagram of a first black-supplemented pattern provided by an embodiment of the present disclosure.

For example, as shown in FIG. 2, during specific implementation, step S103 that supplementing and displaying black for part of pixels in the second display region S2 includes: a plurality of first closed patterns A1 nested in sequence are formed by controlling pixels with black supplemented of the second display region S2; and a plurality of second closed patterns A2 nested in sequence are formed by controlling pixels without black supplemented of the second display region S2; the first closed patterns A1 and the second closed patterns A2 are alternately arranged.

In the some embodiments, the first closed patterns A1 and the second closed patterns A2 can be of a frame shape, for example, the first closed patterns A1 and the second closed patterns A2 can be rectangular frames, and each border of the rectangular frame is formed by a single row or column of pixels. In the embodiment of the present disclosure, the plurality of first closed patterns A1 nested in sequence are formed by controlling pixels with black supplemented of the second display region S2; the plurality of second closed patterns A2 nested in sequence are formed by controlling pixels without black supplemented of the second display region S2, and the first closed patterns A1 and the second closed patterns A2 are alternately arranged, so that the brightness of different positions of the second display region can be basically consistent to avoid the problem that the brightness of different positions is different due to the fact that the density distributions of the black-supplemented pixels at different positions are different.

In some embodiments, the shapes of the first closed patterns A1 and the second closed patterns A2 are similar to the shape of the first display region S1. That is, for example, if the shape of the first display region S1 is square, the shapes of the first closed patterns A1 and the shapes of the second closed patterns A2 are also square. For another example, if the shape of the first display region S1 is circular, the shapes of the first closed patterns A1 and the shapes of the second closed patterns A2 are also circular.

Figure 3:
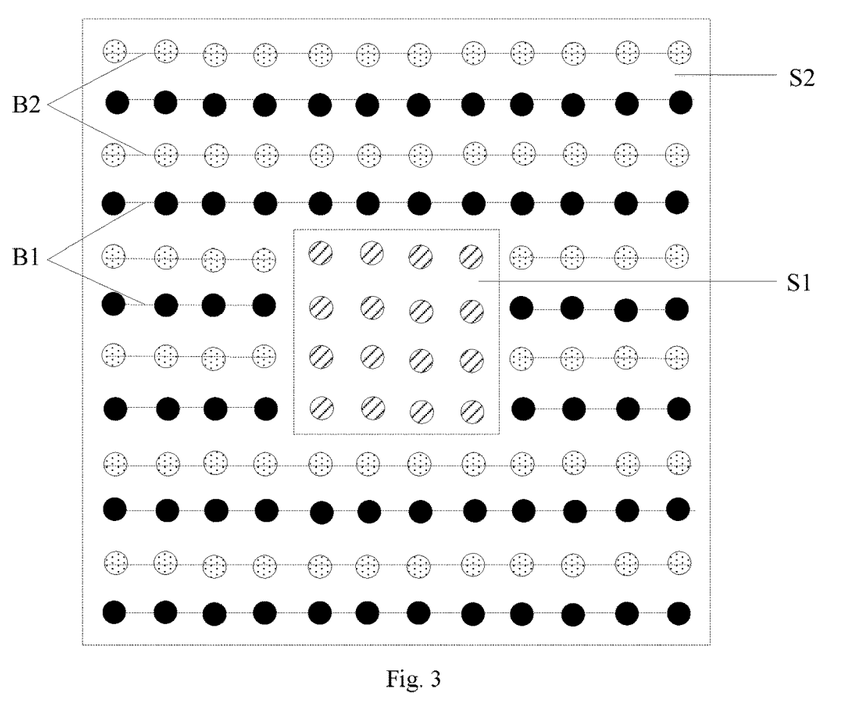
FIG. 3 is a schematic diagram of a second black-supplemented pattern provided by an embodiment of the present disclosure.

In some embodiments, with reference to FIG. 3, said supplementing and displaying black for part of pixels in the second display region S2, including that a plurality of first pixel groups B1, extending in a first direction, are formed by controlling pixels with black supplemented of the second display region S2; a plurality of second pixel groups B2, extending in the first direction, are formed by controlling pixels without black supplemented of the second display region S2; and the first pixel groups B1 and the second pixel groups B2 are alternately arranged.

It can be understood that if the first direction passes through the first display region S1, pixels included in the first pixel groups B1 should be pixels in this direction other than the first display region S1. In the embodiment of the present disclosure, a plurality of first pixel groups B1, extending in a first direction, are formed by controlling pixels with black supplemented of the second display region S2; a plurality of second pixel groups B2, extending in the first direction, are formed by controlling pixels without black supplemented of the second display region S2, and the first pixel groups B1 and the second pixel groups B2 are alternately arranged, so that small improvement can be made to a pixel display mode in the prior art, and the mode of supplementing black for displaying is simpler and easy to realize.

Figure 4:
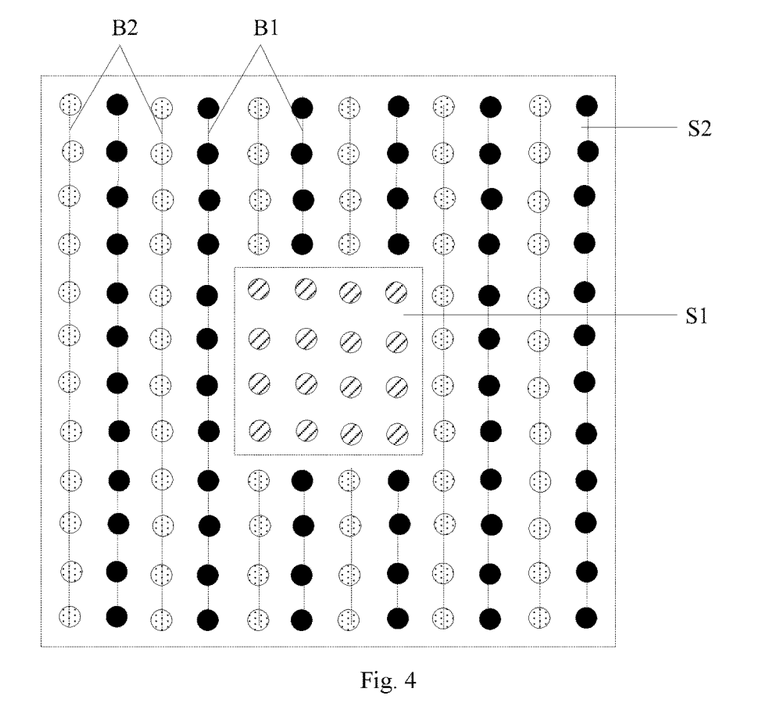
FIG. 4 is a schematic diagram of a third black-supplemented pattern provided by an embodiment of the present disclosure.

In some embodiments, the first direction is a pixel row direction, referring to FIG. 3; and the first direction can also be a pixel column direction, referring to FIG. 4.

Of course, during specific implementation, the black-supplemented pixels and the non-black-supplemented pixels of the second display region can further be controlled to form other patterns. The present disclosure is not limited to this.

During specific implementation, step S102 that controlling the display in a first display region of the screen of the VR display device to be at the first definition; and controlling the display in the second display region, other than the first display region, of the screen of the VR display device to be at the second definition includes the following step.

Step S1021, stretching a second image, received for displaying in the second display region, into a stretched second image with a same resolution as a resolution of the screen of the VR display device; and full-screen displaying the stretched second image in the second display region.

That is, the image displayed in the second display region is an image obtained by stretching the received image.

Step S1022, covering the first display region by a first image with an original resolution, received for displaying in the first display region; and displaying the first image with the original resolution in the first display region.

Figure 5:
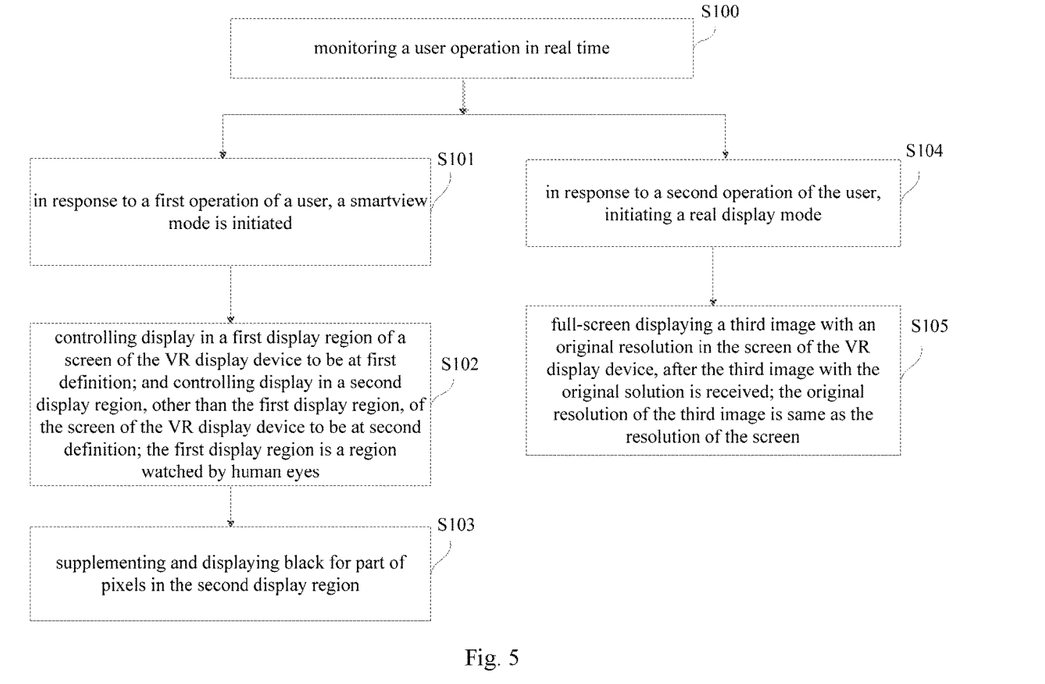
FIG. 5 is a flowchart of a specific display method for a VR display device provided by an embodiment of the present disclosure.

During specific implementation, referring to FIG. 5, the display method further includes the following steps:

step S104, in response to a second operation of the user, initiating a real display mode; and step S105, full-screen displaying a third image with an original resolution in the screen of the VR display device, after the third image with the original resolution is received; the original resolution of the third image is same as the resolution of the screen.

In the embodiments of the present disclosure, the display method further includes: in response to the second operation of the user, the real display mode is initiated; and full-screen displaying is performed at original resolution on the third image that is received and has the same resolution as the screen of the VR display device. Therefore, the virtual display device can be intelligently switched between the smartview mode and the real display mode according to needs, and functions of the whole machine are enriched.

During specific implementation, with reference to FIG. 5, before the step S101, i.e., in response to a first operation of a user, initiating a smartview mode, the display method further includes the step that step S100, monitoring a user operation in real time.

During specific implementation, after the step S101 and before the step S102, i.e., after the in response to the first operation of the user, initiating the smartview mode, and before the controlling the display in the first display region of the screen of the VR display device to be at the first definition, and controlling display in the second display region, other than the first display region, of the screen of the VR display device to be at the second definition, the display method further includes the following steps:

step S201, acquiring the region watched by a human eye;

step S202, rendering an original first image corresponding to the region watched by the human eyes, and rendering an original second image corresponding to other regions other than the region watched by the human eyes; and step S203, generating the first image by performing image algorithm processing on the original first image, and generating the second image by performing image algorithm processing on the original second image.

Embodiments of the present disclosure further provide a VR display device, including a processing component. The processing component is used for executing the display method provided by the embodiment of the present disclosure.

Figure 6:
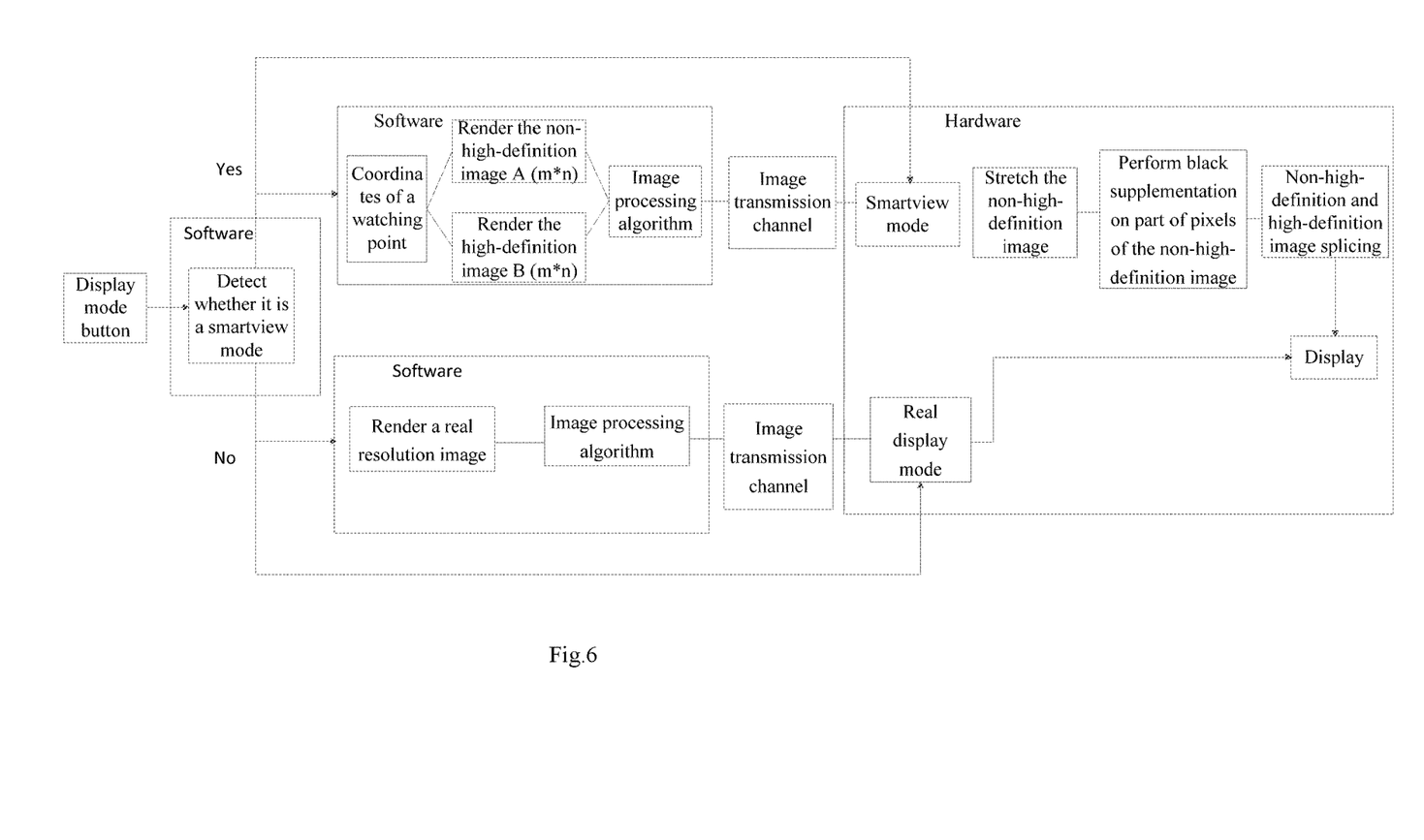
FIG. 6 is a flowchart of another specific display method for a VR display device provided by an embodiment of the present disclosure.

In order to understand the display method for the VR display device provided by the embodiments of the present disclosure more clearly, specific descriptions are made below in combination with FIG. 6.

The VR display device in the embodiments of the present disclosure can include: a VR display component (for example, it can be a virtual display helmet) and a computer device. The processing component in the VR display device can include a first processing component in the VR display component, and a second processing component in the computer device. Two buttons (which can be entity buttons arranged on the VR display component, or can be icon buttons displayed on the computer device, i.e., a view mode is selected through a software applet) can be arranged on the VR display device, and the two buttons represent a smartview mode and a real display mode, respectively. The user can select a desired mode for experiencing as required before use.

During displaying, the following several steps can be executed.

Firstly, a software side may continuously monitor whether a button is pressed and which display mode is selected when the button is pressed, and transmit selected display mode information to software and hardware.

Secondly, the software outputs an image according to the selected display mode, and the hardware switches a parsing solution according to the selected display mode, for example:

For the smartview mode, steps for the software side can include:
1, obtaining a watching region according to an eyetracking technology;
2, rendering a non-high-definition image, and rendering a high-definition image of the eye watching region, i.e., rendering an original first image corresponding to the human eye watching region and rendering an original second image corresponding other regions other than the human eye watching region;
3, performing image algorithm processing on the high-definition image and the non-high-definition image, wherein common algorithms include image enhancement, Local Dimming algorithm, etc., i.e., generating a first image by performing image algorithm processing on the original first image, and generating a second image by performing image algorithm processing on the original second image; and
4, transmitting the processed high-definition image (i.e., the first image) and the non-high-definition image (i.e., the second image) to the VR display component of a hardware side through a transmission wire.

Steps for the hardware side include:
5, stretching the second image that is received for displaying in the second display region into a stretched second image with a same resolution as a resolution of the screen of the VR display device, and performing full-screen displaying the stretched second image in the second display region;
6, performing black supplementation on part of pixels of the non-high-definition image, i.e., supplementing and displaying black for part of pixels in the second display region;
7, covering the first display region by a first image with an original resolution, the first image is received for displaying in the first display region, i.e., splicing the received high-definition and non-high-definition images into one spliced image; and
8, displaying the spliced image.

For the real display mode, on the software side, the display solution can be consistent with the traditional VR display solution, and can include:
1, rendering a real resolution image;
2, performing image algorithm processing; and
3, transmitting the processed image to the VR display component of the hardware side through the transmission wire, and performing corresponding displaying on the hardware side.

It should be noted that the software side described above can be a program code stored in a storage component of the computer device, and a corresponding implementation process can be realized by reading the program code of the storage component by the second processing component of the computer device. The hardware side can refer to the first processing component on the VR display component, for example an IC.

The embodiments of the present disclosure have the following beneficial effects: the VR display method provided by the embodiments of the present disclosure includes: in response to the first operation of the user, initiating the smartview mode; controlling the display in the first display region of the screen of the VR display device to be at the first definition; controlling the display in the second display region, other than the first display region, of the screen of the VR display device to be at the second definition; and supplementing and displaying black for the part of pixels in the second display region; the first display region is a region watched by human eyes; and the first definition is greater than the second definition. That is, since the second display region is a non-human eyes watching region, it is not mainly used for viewing and displaying; by means of supplementing black for the part of pixels of the second display region for displaying, the feature of low resolution of the non-human eyes watching region is better satisfied while watching on the first display region by the human eyes is not affected; moreover, the power consumption of the non-high-resolution display region is greatly reduced; and therefore, the problems of higher power consumption and waste of resources of the VR display device caused by the fact that all pixels of the second display region of the non-human eyes watching region are to be turned on are avoided.

Obviously, those skilled in the art can make various changes and modifications to the present disclosure without departing from the spirit and scope of the present disclosure. Therefore, if these changes and transformations of the present disclosure fall within the scope of the claims of the present disclosure and equivalent technologies of the present disclosure, the present disclosure is intended to include these changes and transformations.

What is claimed is:

1. A display method for a virtual reality (VR) display device, comprising:
in response to a first operation of a user, initiating a smartview mode;
controlling a display in a first display region of a screen of the VR display device to be at a first definition;
controlling the display in a second display region, other than the first display region, of the screen of the VR display device to be at a second definition; and
supplementing black for a part of pixels in the second display region and displaying the part of pixels;
wherein the first display region is a region watched by human eyes; and the first definition is greater than the second definition.

2. The display method according to claim 1, wherein:
a plurality of first closed patterns nested in sequence are formed by the part of pixels;
a plurality of second closed patterns nested in sequence are formed by pixels, other than the part of pixels, in the second display region; and
the first closed patterns and the second closed patterns are alternately arranged.

3. The display method according to claim 2, wherein shapes of the first closed patterns and the second closed patterns are similar to a shape of the first display region.

4. The display method according to claim 1, wherein:
   a plurality of first pixel groups, extending in a first direction, are formed by the part of pixels;
   a plurality of second pixel groups, extending in the first direction, are formed by pixels, other than the part of pixels, in the second display region; and
   the first pixel groups and the second pixel groups are alternately arranged.

5. The display method according to claim 4, wherein the first direction is a pixel row direction or a pixel column direction.

6. The display method according to claim 1, wherein said controlling the display in the first display region of the screen of the VR display device to be at the first definition; and said controlling the display in the second display region, other than the first display region, of the screen of the VR display device to be at the second definition comprises:
   stretching a second image, received for displaying in the second display region, into a stretched second image with a same resolution as a resolution of the screen of the VR display device;
   full-screen displaying the stretched second image in the second display region; and
   covering the first display region by a first image with an original resolution, received for displaying in the first display region; and
   displaying the first image with the original resolution in the first display region.

7. The display method according to claim 1, further comprising:
   in response to a second operation of the user, initiating a real display mode; and
   full-screen displaying a third image with an original resolution in the screen of the VR display device, after the third image with the original resolution is received;
   wherein the original resolution of the third image is same as the resolution of the screen.

8. The display method according to claim 1, wherein before the in response to the first operation of the user, initiating the smartview mode, the display method further comprises:
   monitoring a user operation in real time.

9. The display method according to claim 1, wherein after the in response to the first operation of the user, initiating the smartview mode, and before said controlling the display in the first display region of the screen of the VR display device to be at the first definition, and controlling the display in the second display region, other than the first display region, of the screen of the VR display device to be at the second definition, the display method further comprises:
   acquiring the region watched by the human eyes;
   rendering an original first image corresponding to the region watched by the human eyes, and rendering an original second image corresponding to other regions other than the region watched by the human eyes; and
   generating the first image by performing image algorithm processing on the original first image, and generating the second image by performing image algorithm processing on the original second image.

10. A virtual reality (VR) display device, comprising at least one processor and a memory, wherein the processor is configured to execute computer instructions in the memory, to:
    in response to a first operation of a user, initiate a smartview mode;
    control a display in a first display region of a screen of the VR display device to be at a first definition;
    control the display in a second display region, other than the first display region, of the screen of the VR display device to be at a second definition; and
    supplement black for a part of pixels in the second display region and display the part of pixels;
    wherein the first display region is a region watched by human eyes; and the first definition is greater than the second definition.

11. The display device according to claim 10, wherein the processor is further configured to:
    form a plurality of first closed patterns nested in sequence by the part of pixels; and
    form a plurality of second closed patterns nested in sequence by pixels, other than the part of pixels, in the second display region;
    wherein the first closed patterns and the second closed patterns are alternately arranged.

12. The display device according to claim 11, wherein shapes of the first closed patterns and the second closed patterns are similar to a shape of the first display region.

13. The display device according to claim 10, wherein the processor is further configured to:
    form a plurality of first pixel groups, extending in a first direction, by the part of pixels; and
    form a plurality of second pixel groups, extending in the first direction, by pixels, other than the part of pixels, in the second display region;
    wherein the first pixel groups and the second pixel groups are alternately arranged.

14. The display device according to claim 13, wherein the first direction is a pixel row direction or a pixel column direction.

15. The display device according to claim 10, wherein the processor is further configured to:
    stretch a second image, received for displaying in the second display region, into a stretched second image with a same resolution as a resolution of the screen of the VR display device;
    full-screen display the stretched second image in the second display region; and
    cover the first display region by a first image with an original resolution, received for displaying in the first display region; and
    display the first image with the original resolution in the first display region.

16. The display device according to claim 10, wherein the processor is further configured to:
    in response to a second operation of the user, initiate a real display mode; and
    full-screen display a third image with an original resolution in the screen of the VR display device, after the third image with the original resolution is received;
    wherein the original resolution of the third image is same as the resolution of the screen.

17. The display device according to claim 10, wherein the processor is further configured to:
    monitor a user operation in real time.

18. The display device according to claim 10, wherein the processor is further configured to:
    acquire the region watched by the human eyes;
    render an original first image corresponding to the region watched by the human eyes, and render an original second image corresponding to other regions other than the region watched by the human eyes; and
    generate the first image by performing image algorithm processing on the original first image, and generate the second image by performing image algorithm processing on the original second image.

\* \* \* \* \*